(12) United States Patent
Shemer et al.

(10) Patent No.: US 11,921,747 B2
(45) Date of Patent: *Mar. 5, 2024

(54) SELF HEALING FAST SYNC ANY POINT IN TIME REPLICATION SYSTEMS USING AUGMENTED MERKLE TREES

(71) Applicant: EMC IP Holding Company LLC, Hopkinton, MA (US)

(72) Inventors: Jehuda Shemer, Kfar Saba (IL); Alex Solan, Hertzelia (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,340

(22) Filed: Jun. 23, 2022

(65) Prior Publication Data

US 2022/0327143 A1 Oct. 13, 2022

Related U.S. Application Data

(63) Continuation of application No. 16/713,734, filed on Dec. 13, 2019, now Pat. No. 11,386,122.

(51) Int. Cl.
*G06F 16/27* (2019.01)
*G06F 9/54* (2006.01)
(Continued)

(52) U.S. Cl.
CPC ............ *G06F 16/273* (2019.01); *G06F 9/546* (2013.01); *G06F 11/1492* (2013.01);
(Continued)

(58) Field of Classification Search
CPC .... G06F 16/273; G06F 9/546; G06F 11/1492; G06F 16/128; G06F 16/137; G06F 16/2246; G06F 16/2322; G06F 2201/84
(Continued)

(56) References Cited

U.S. PATENT DOCUMENTS 6,529,917 B1 3/2003 Zoltan
7,437,601 B1 10/2008 Manley et al.
(Continued)

FOREIGN PATENT DOCUMENTS

DE 102011012444 A1 * 8/2012 ....... G06F 17/30575

OTHER PUBLICATIONS

Bharatendra Boddu, Using Merkle trees to detect inconsistencies in data, Jul. 2, 2013, retrieved on Dec. 14, 2022, retrieved from the Internet <URL: http:/distributeddatastore.blogspot.com/2013/07/cassandra-using-merkle-trees-to-detect.html > (Year: 2013).
(Continued)

*Primary Examiner* — Phuong Thao Cao
(74) *Attorney, Agent, or Firm* — Workman Nydegger (57) ABSTRACT

Replication operations of replicating data from a production site to a replica site. The replication is performed using independent Merkle trees. The Merkle trees are updated asynchronously using Merkle trees that have been augmented with a time-based value. The synchronization is verified by comprising root hashes of the independent Merkle trees at certain points in time. The replication and Merkle trees are self-healing and trigger a resynchronization when a discrepancy is discovered.

20 Claims, 6 Drawing Sheets

(51) Int. Cl.
*G06F 11/14* (2006.01)
*G06F 16/11* (2019.01)
*G06F 16/13* (2019.01)
*G06F 16/22* (2019.01)
*G06F 16/23* (2019.01)

(52) U.S. Cl.
CPC .......... *G06F 16/128* (2019.01); *G06F 16/137* (2019.01); *G06F 16/2246* (2019.01); *G06F 16/2322* (2019.01); *G06F 2201/84* (2013.01)

(58) Field of Classification Search
USPC ........................................................ 707/610
See application file for complete search history.

(56) References Cited

U.S. PATENT DOCUMENTS

| | | | |
|---|---|---|---|
| 8,224,935 B1* | 7/2012 | Bandopadhyay | G06F 9/5072 709/248 |
| 8,260,742 B2* | 9/2012 | Cognigni | G06F 16/27 707/624 |
| 8,345,707 B2 | 1/2013 | Stark et al. | |
| 9,418,131 B1* | 8/2016 | Halevi | G06F 16/27 |
| 9,613,046 B1* | 4/2017 | Xu | H04L 67/1095 |
| 10,095,428 B1 | 10/2018 | Meiri et al. | |
| 10,250,679 B1 | 4/2019 | Natanzon et al. | |
| 10,671,639 B1 | 6/2020 | Acheson et al. | |
| 11,055,351 B1* | 7/2021 | Shyu | G06F 16/2379 |
| 2003/0014432 A1 | 1/2003 | Teloh et al. | |
| 2008/0250086 A1 | 10/2008 | Kisley | |
| 2010/0198849 A1 | 8/2010 | Thomas et al. | |
| 2010/0257149 A1* | 10/2010 | Cognigni | G06F 16/27 711/216 |
| 2010/0309933 A1* | 12/2010 | Stark | G06F 16/2246 370/503 |
| 2014/0143205 A1 | 5/2014 | Leshchiner et al. | |
| 2015/0242478 A1* | 8/2015 | Cantwell | H04L 67/1095 707/634 |
| 2015/0277794 A1* | 10/2015 | Tudor | G06F 3/0619 711/103 |
| 2016/0110261 A1 | 4/2016 | Parab et al. | |
| 2016/0366094 A1 | 12/2016 | Mason et al. | |
| 2017/0013058 A1 | 1/2017 | Annamalai et al. | |
| 2017/0075938 A1 | 3/2017 | Black et al. | |
| 2017/0111442 A1 | 4/2017 | Aronovich et al. | |
| 2017/0300247 A1 | 10/2017 | Dewey et al. | |
| 2018/0307709 A1 | 10/2018 | Xie et al. | |
| 2019/0034507 A1 | 1/2019 | Duttagupta et al. | |
| 2020/0007341 A1 | 1/2020 | Veeningen | |

OTHER PUBLICATIONS

Marc Clifton, Understanding Merkle Trees, Mar. 13, 2017, retrieved on Dec. 14, 2022, retrieved from the internet <URL: https://www.codeproject.com/Articles/1176140/Understanding-Merkle-Trees-Why-Use-Them-Who-Uses-T > (Year: 2017).

DeCandia et al., Dynamo: Amazon's Highly Available Key-Value Store, SOSP '07, Oct. 14-17, 2007, retrieved on Apr. 11, 2022, retrieved from the internet <URL: https://www.allthingsdistributed.com/files/amazon-dynamo-sosp2007.pdf> (Year: 2007).

Oracle Database Online Documentation, 10g Release 2 (10.2), archived Nov. 27, 2011, retrieved on Apr. 12, 2022, retrieved from the Internet <URL: https://web.archive.org/web/20111127132008/https://docs.oracle.com/cd/B19306_01/server.102/b14220/logical.htm> (Year: 2011).

* cited by examiner

SELF HEALING FAST SYNC ANY POINT IN TIME REPLICATION SYSTEMS USING AUGMENTED MERKLE TREES

RELATED APPLICATIONS

This application is related to U.S. patent application Ser. No. 16/713,146, entitled USING MERKLE TREES IN ANY POINT IN TIME REPLICATION, filed Dec. 13, 2019. The aforementioned application is incorporated herein in its entirety by this reference.

FIELD OF THE INVENTION

Embodiments of the present invention generally relate to data protection operations. More particularly, at least some embodiments of the invention relate to systems, hardware, software, computer-readable media, and methods for data protection operations including replication operations using trees such as Merkle trees.

BACKGROUND

A common data protection operation is to replicate data from a production site to a replica site. Replication generally involves sending production data from a production site to a replica site such that the replica data is the same as the production data. A simplistic approach to synchronizing the production site with the replica site is to read the production volume, read the replica volume, send all of the production data on the production volume to the replica site and perform a comparison.

This process can be improved using hashes. More specifically, the production volume can be read and the blocks of the production volume can be hashed. The hashes are sent to the replica site and compared with corresponding hashes generated from the data stored on the replica volume. The data for hashes that differ can then be sent from the production site to the replica site. This process can result in a substantial improvement because substantially less data needs to be transferred compared to sending all of the data. Of course, if the production volume and the replica volume are completely different, the data must still be sent. Overall, however, the amount of data to be transmitted is reduced.

This process can be further improved using a Merkle tree. A Merkle tree is a tree of hashes in one example. The Merkle tree makes it possible to only send a subset of the hashes and/or blocks. For example, if the number of blocks that differ is relatively small, a lot of time will be saved. The overall time is limited to log(n)*nDiffBlocks, but usually will be much shorter, because the traversal is not begun anew for each block that should be sent. Rather, a traverse of a partial binary tree with k leaves is required. A better estimation is a k*log(k) time.

Consider the following numerical example. Suppose there is a 1 TB production disk which needs to be synched to a replica disk and that 0.5% of the blocks differ. Simplistically, $10^{12}$ bytes will be sent over the network. If there is a hash per block, $10^{12}/4096$ (244 M) hashes will be send over the network. With a Merkle tree, the tree will be traversed in the time: $10^{12}/(4096*200)*\log(10^{12}/(200*4096))=7$ M. As a result, the actual data sent is about 1 M. Even with the improvement offered by a Merkle tree, there is still a need to improve the replication process and to reduce latencies or at least prevent latencies from increasing.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations. More particularly, at least some embodiments of the invention relate to systems, hardware, software, computer-readable media, and methods for performing data protection operations including, by way of example only, backup operations restore operations, replication operations, deduplication operations, tree operations including Merkle tree operations, synchronization operations, healing operations or the like or combination thereof.

In general, example embodiments of the invention relate to replicating data using Merkle trees and to self-healing replication operations. In embodiments of the invention, Merkle trees can be used to synchronize production data with replica data and to determine whether production data is synchronized with replica data at various points in time. If a discrepancy is discovered (e.g., the production data and the replica data are not synchronized), a synchronization can be triggered to heal or correct the discrepancy. The synchronization can be initiated automatically. As a result, the replication self-heals.

Embodiments of the invention further relate to updating Merkle trees and to updating trees such as Merkle trees without incurring additional latencies or with reduced latencies. Embodiments of the invention do not add latency or add minimal latency, are computationally efficient, perform self-healing when inconsistencies or discrepancies are discovered, and support multiple replica sites. In addition to the production site, each replica site may be associated with a Merkle tree. This allows the production data to be synchronized with multiple sites. If data is replicated more than once (from a first replica site to a second replica site), Merkle trees can also be used for this process.

Figure 1:
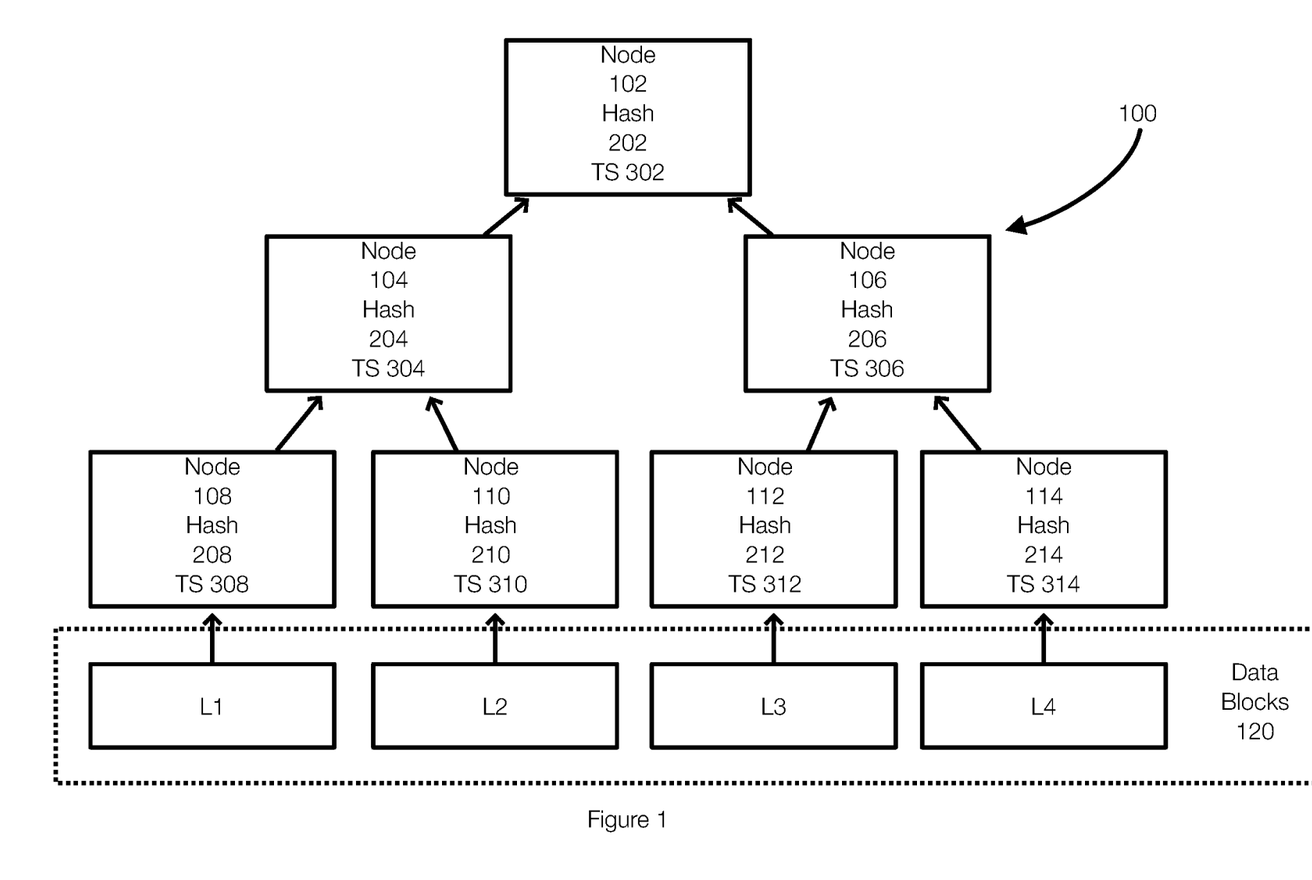
FIG. 1 discloses aspects of a Merkle tree.

FIG. 1 illustrates an example of a Merkle tree 100 (tree 100). The tree 100 includes a plurality of nodes including a root node 102. The tree 100 can have any number of levels and is typically associated with a block-based device or devices where the data can be chunked or represented in chunks. A block-based device, by way of example only, is a device that includes a computer readable medium that supports reading and/or writing in fixed size blocks, sectors, chunks, or the like. Although a Merkel tree for a given device may have many levels, the tree 100 illustrates three levels for convenience: the root node 102, the leaves or leaf nodes 108, 110, 112 and 114 and an intermediary level that includes the nodes 104 and 106 in this example.

The tree 100 is constructed such that each of the leaf nodes corresponds to a block on the device. Each leaf node thus represents data stored on a portion of a volume or of a disk (whether real or virtual). Each leaf node may correspond to a specific location on the volume or the disk. The leaf node 108, for example, contains or is associated with a hash 208 (or other identifier or fingerprint). The hash 208 is a hash of a data block L1 that is included in the data blocks 120 and that is stored at a location L1. Each of the leaf nodes 110, 112, and 114 similarly includes a corresponding hash 210, 212 and 214 that are hashes of, respectively, data blocks L2, L3 and L4.

The hash 204 in the node 104 is a hash of the hashes 208 and 210. Similarly, the hash 206 is a hash of the hashes 212 and 214. The root hash 202 is a hash of the hashes 204 and 206.

In this example, the nodes 104, 108 and 110 represent a subtree or an area of the tree 100. When writes are localized, they may affect a subtree. This localization allows updates to be performed more effectively and allows the data to be transferred to be minimized. While embodiments of the invention are discussed using hashes, other identifiers or representations could be used. Typically, the identifiers are selected in order to form a unique representation of the corresponding data.

Effectively, the root hash 202 represents all of the data blocks 120 stored on a device. As described in more detail herein, the root hash 202 can be used to determine whether replica data is a copy of source data or whether the replica disk (or disks) is the same as or synchronized with the production disk (or disks). As discussed herein, both the production data and the replica data are associated with their own Merkle trees. Because the root hashes represent the data blocks 120 as a whole, the production data and the replica data are synchronized when the root hashes match.

In one example, the root hashes are compared as the root hashes exist at certain points in time. In embodiments of the invention, however, these root hashes are processed asynchronously and may not be available at the same time. However, the root hashes allow synchronization to be evaluated and for healing operations to be initiated if necessary.

For example, the root hash of a production Merkle tree corresponding to a certain snapshot may be compared to the root hash of a replica Merkel tree corresponding to the same snapshot. When the root hashes match, the production data and the replica data are synchronized at least for that point in time. If the root hashes do not match for that snapshot, a healing operation or resynchronization operation may be initiated. The process of determining whether the production data and the replica data are synchronized is discussed in more detail herein.

Generally, when a data block at the production data changes, it is necessary to update the production Merkle tree, send the data to the replica data for storage at the replica site, and update the replica Merkle tree.

A simplistic implementation of this process can result in significant latencies and the need for substantial computing resources. For example, if the data block L1 is updated, this results in a change to the hash 208 in the node 108. In order to fully update the tree 100, it is also necessary to change or update the hash 204 and the root hash 202. In effect, updating the tree for every change to a data block can consume significant resources and causes the root hash 202 to be updated with every data block change. A 1 TB disk may have 2 billion blocks and be associated with a tree that has a depth of 31. This would require 31 hash operations just to update the tree for a change to a single data block.

The process of simply updating the tree for every input/output (IO) or every change to the production data can be improved using Merkle trees. By creating a production Merkle tree for the production data (or disk) and a replica Merkle tree for the replica data (or disk), the trees can be traversed and it may only be necessary to transfer data associated with a subset of the tree. If only a specific area of the disk has changed, it is only necessary to send hashes and blocks corresponding to the area of the subtree that is affected by the changes. The production disk or group of volumes and the replica disk or group of volumes, whether virtual or physical, should be identical in structure and the size of the disks or volumes should match. This ensures that the corresponding Merkle trees are identical in size and structure and allow the production data and the replica data to be synchronized.

FIG. 1 further illustrates that the tree 100 has been augmented with an identifier, which may be a time related value. This value is represented by the timestamps (TS) 302, 304, 306, 308, 310, 312, and 314 in the tree 100. The time related value can be any value such as an incrementing value (an 10 counter, a clock value, or the like). In one example, snapshot identifiers (SID) may be used because SIDs are also incrementing in value. As nodes in the tree 100 are updated, the time related value or identifier is added or updated as well in nodes of the tree 100.

Figure 2A:
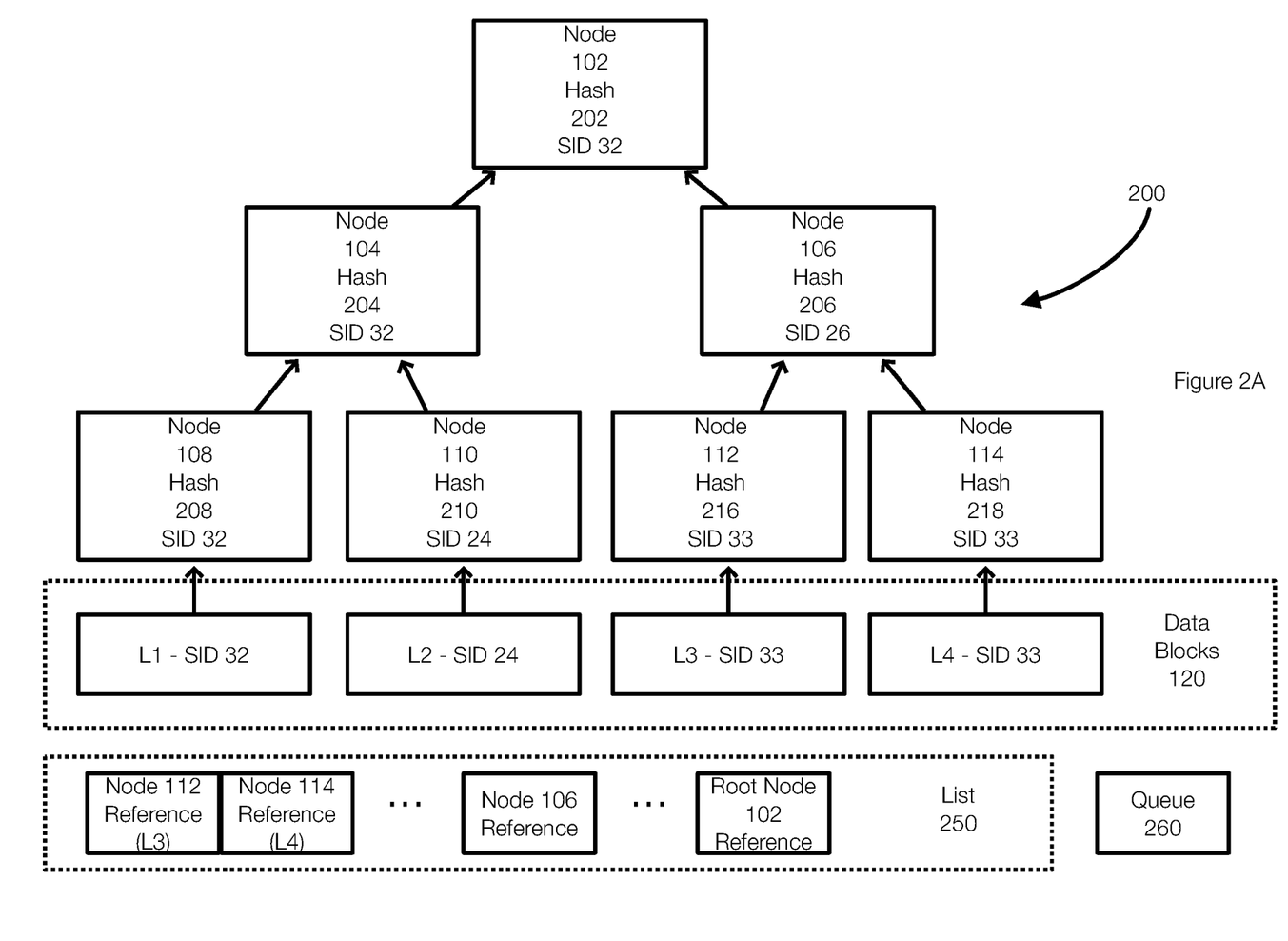
FIG. 2A illustrates an example of a Merkle tree augmented with a time related value that can be updated asynchronously.
Figure 2B:
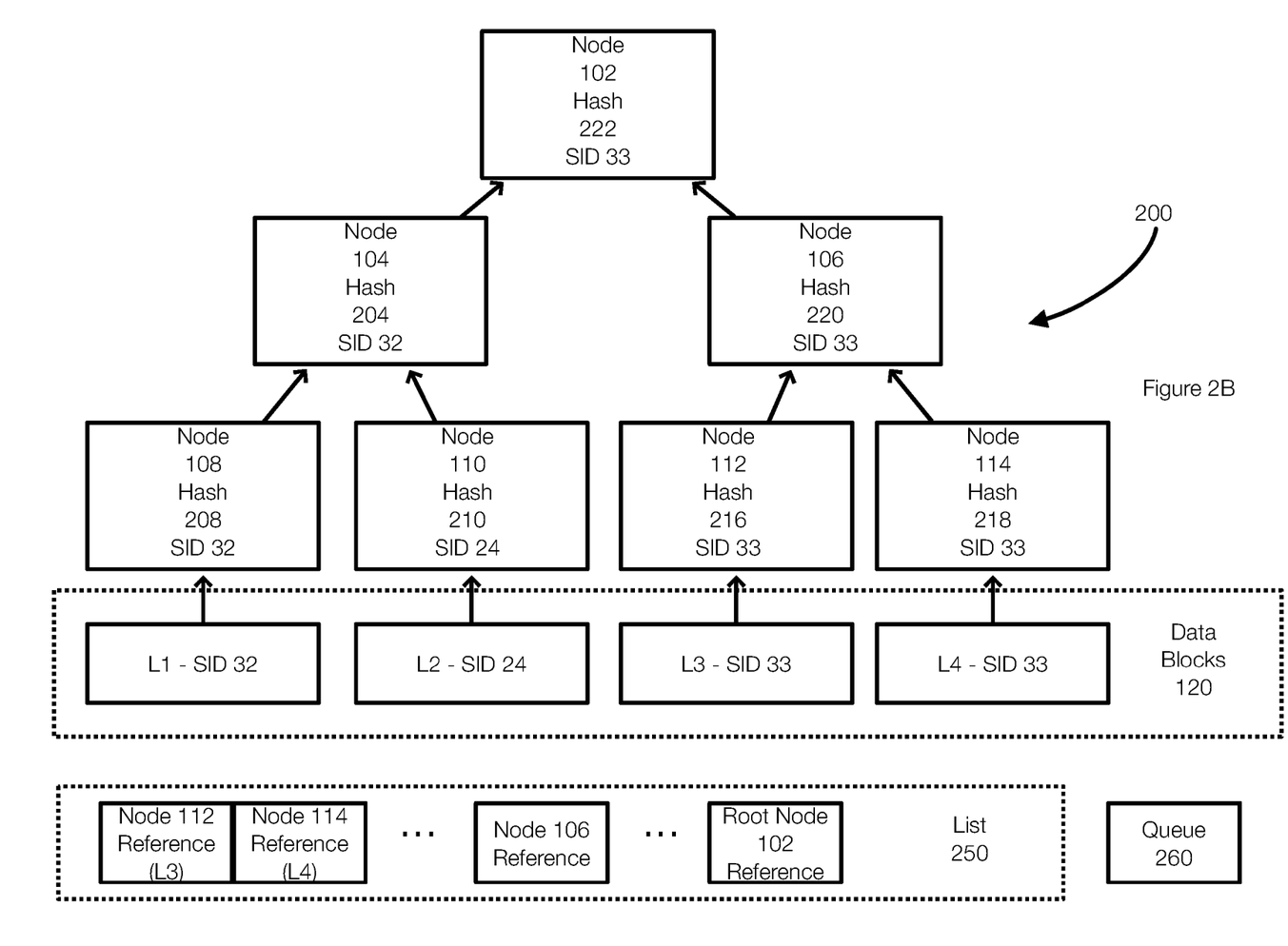
FIG. 2B illustrates an example of an updated Merkle tree.
Figure 3:
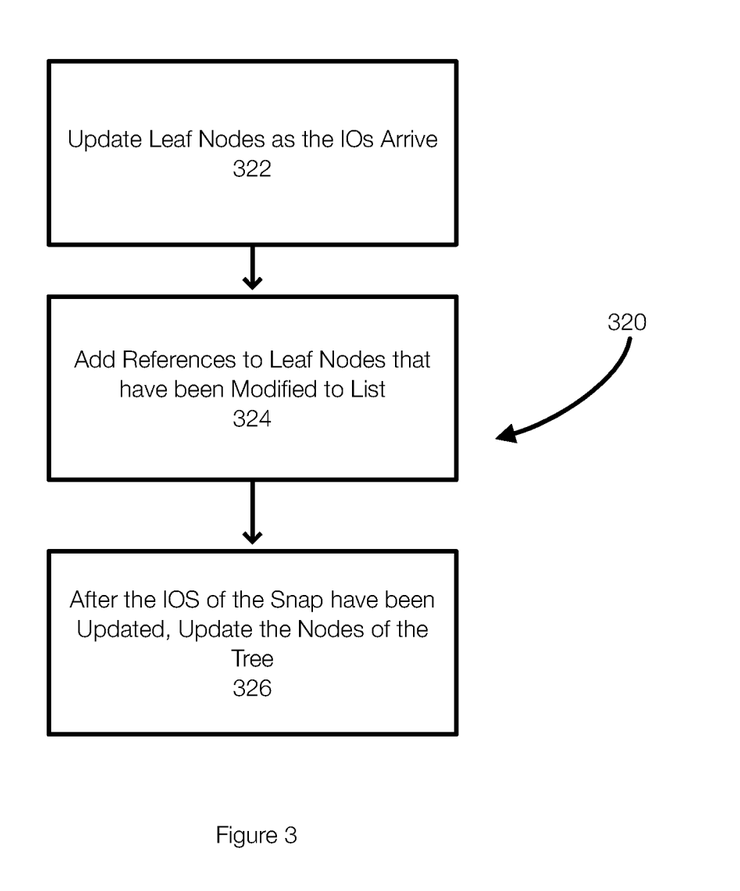
FIG. 3 illustrates an example of a method for updating a Merkle tree.

FIG. 2A illustrates a Merkle tree during an update operation. The tree 200 is an example of the tree 100 and includes additional detail and represents the tree 200 during an update. In the tree 200, snapshot identifiers (SIDs) are used as the time related value. FIG. 2B illustrates the tree 200 after the tree 200 has been updated by the update operation. FIG. 3 illustrates an example of a method for updating a tree such as the tree 200.

The tree 200 is updated, by way of example only, asynchronously and in a computationally efficient manner. More specifically, a replica tree is updated asynchronously with respect to a production tree and vice versa. The tree 200 can be updated while tracking input/outputs (IOs or changes) at the production site and while coordinating the production site and the replica site. In addition, embodiments of the invention also enable point-in-time (PiT) backups.

In one example, the tree 200 is updated at a snapshot level, although other levels could be implemented. For continuous replication, a SID is incremented every time a snapshot is closed. In this example, the SID is the time related value used to augment the Merkle tree and the tree is updated using the SID. This allows the production data and the replica data to be synchronized at the granularity of snapshots.

The tree 200 is representative of a Merkle tree associated with a production site or a Merkle tree associated with a replica site. If there are more than one replica site, each replica site may have its own tree 200. Further, because the trees at the production site and the replica site are updated asynchronously, the updates can occur at different times. In fact, the replica tree may be updated before the production tree in some instances.

The tree 200 is updated using the time related value such as a SID. In one example, the tree may be updated in a computationally efficient manner when the IOs or changes are batched or queued, such as when closing a snapshot. By way of example only, a snapshot is the granularity in which the replication process sends data from one side to the other.

When recovering, the recovery operation goes to a certain snapshot and not a specific IO. In this example, the changes or IOs are queued and the Merkle Tree is updated only when the snapshot is closed. In one example, data may be sent to the other side, such as the replica site, when the snapshot is closed. As a result, the queue may contain IOs or other transactions related to a specific snapshot in some embodiments. Alternatively, the queue is processed based on a snapshot granularity. Thus, when updating the tree, only entries in the queue associated with a particular SID are processed at a time. Thus, the next snapshot is not processed and the tree is not updated for the next snapshot until after the current snapshot is processed and the tree is updated for the current snapshot.

The tree 200 may be associated with a list 250 to facilitate the coordination between the trees and allow an asynchronous paradigm. In one example, the list 250 is an example of a structure used in updating the tree 200.

The need to calculate the same hashes multiple times is avoided by using the augmented tree 200, which is augmented with a time related value. In one example, updates to the Merkle tree are performed at a snapshot granularity as previously stated. In one example, the lowest consumption resolution is at the same snapshot granularity.

In a PiT (Point in Time) snapshot, time is typically short and, as a result, the IOs or changes within the snapshot may be localized. As a result, coordinated updates of the hashes will avoid repeated hash calculations of the same hash in each local subtree or in the tree as a whole, particularly in the context of an update operation for a particular set of changes such as a snapshot.

Next, if the updates are performed in a particular order, the same hash will not be recalculated multiple times with regard to the same snapshot. The hash of a node of the tree, when calculated, is marked or associated with the SID and is not modified again for this particular snapshot having the same SID.

In some examples, the production storage system may already calculate the hash of the block automatically and the hash can be used as discussed herein. In other words, the hash may be readily available for use in updating the tree 200.

FIG. 3 illustrates an example of a method for updating a tree such as a Merkle tree. The method 320 in FIG. 3 is discussed with reference to FIGS. 2A and 2B. As updates (data block updates) are received (either by the production system or the replication system), the changes may be queued in a corresponding queue 260. As the IOs or changes are received, only the leaf nodes of the tree 200 are updated 322 initially.

In FIG. 2A, data blocks L3 and L4 are received and are associated with a SID of 33 (the snapshot currently being synchronized or closed). In this example, the leaf nodes of the tree 200 are updated. Thus, the node 112 for the data block L3 is updated with the hash 216 of the data block L3. Thus, the SID 33 and the hash 216 are added to the node 112. The hash 216 replaces the hash 212 and the SID 33 replaces the previous SID value. The hash 218 is the hash of the new data block L4 and replaces the hash 214. The node 114 is also associated with the SID 33. Thus, the leaf nodes 112 and 114, which are associated with the received data blocks, are updated. In one example, the information received initially may be an ordered pair such as a location of a block and the corresponding hash. This allows the tree to be updated even if the transfer of the actual data is performed at a different time.

Next, references to the leaf nodes that have been modified or updated are added 324 to a list 250 as node 112 reference and node 114 reference. Thus, the list 250 includes a reference to the node 112 and the node 114. After all of the IOs or changes of or associated with the snapshot have been processed and the corresponding leaf nodes have been updated, the remaining nodes of the tree 200 are updated 326. This is typically done layer by layer from the bottom of the tree 200 up to the root node of the tree 200. In this example, the only nodes to be updated include the node 106 and the root node 102 because only the nodes 112 and 114 were updated for the snapshot whose SID is 33. These nodes (nodes 102 and 106) will be updated as the tree 200 is traversed and these nodes will only be updated once for this particular SID. More specifically, the hashes of the nodes 112 and 114 both changed during this update example. Embodiments of the invention ensure that the node 106 is only updated once even though the node 106 is associated with two changed nodes.

In this example, the layers are updated as follows. Because the list contains pointers or references to the leaf nodes 112 and 114, only the node 106 needs to be updated as the middle layer is traversed. In this example, the hash 206 is changed to the hash 220, which is a hash of the newly added hashes 216 and 218. The timestamp or time related value of the node 106 is changed to SID 33. Finally, as illustrated in FIG. 2B, the root node 102 is updated to the hash 222 and the SID 33 as the tree layers are traversed. The hash 222 is a hash of the hashes 204 and 220.

When the hash 220 or node 106 was updated, a reference to the node 106 was added to the list 250. A reference to the root node 102 is similarly added to the list 250. References to internal nodes of the tree 200 are typically added to the list 250 only once and only when modified. This helps ensure that the update of the tree is minimized at least in terms of traversal.

The following pseudo-code illustrates an example of how the tree 200 shown in FIGS. 2A and 2B is updated.

While ChangedNodesList is not empty:
Currentnode=extract_head_of_list(ChangedNodesList)
If Currentnode.parent.snapID<snapID:
Currentnode.parent.hash=Calculate the hash from children
Currentnode.parent.snapID=snapID
Add Currentnode.parent to ChangedNodesList If all IOs or changes associated with the update or with the snapshot were roughly in the same area of the disk, then the complexity of updating the tree is approximately log(n)–log(k)+k*log(k). Once all the hashes in the k subtree are calculated there is a linear climb to updates hashes up to the root. Hash operations can be expensive operations. As a result, even though the theoretical complexity of the update could be similar to the simplistic approach previously described, the practical difference (when updates are localized with respect to the tree or the disk) is significant.

For example, consider a 1 TB disk that is associated with a tree whose depth is 31. For 1000 IOs in the snapshot, the worst-case scenario is 31000 hash calculations (1000*31). The hash calculations for an optimized approach is approximately 10,020 hash calculations (31–10+1000*10). This is roughly a ⅔ reduction in hash calculations.

Figure 4:
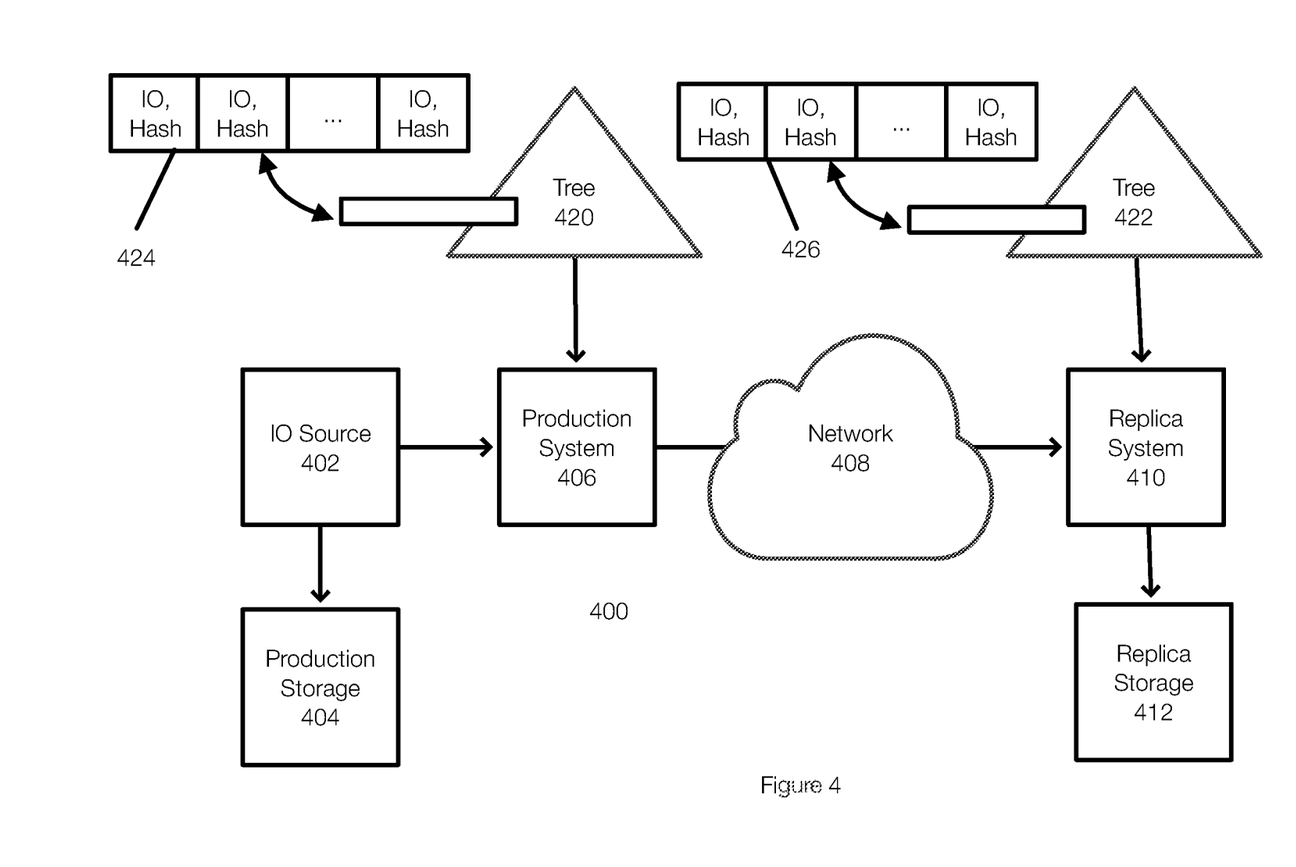
FIG. 4 illustrates an example of a system that replicates data from a production storage to a replica storage.

FIG. 4 illustrates an example of a data protection system implemented in a computer system, where the data protection system is configured to replicate data and perform other data protection operations.

The system 400 illustrates a production system 406, which is an example of a data protection application that may perform replication operations and other data protection operations that is implemented at a production site. The production system 406 may be implemented on hardware and may include storage for storing, for example, snapshots of the production storage 404. The replica system 410 is also part of the data protection system and is implemented on the replica site.

The production site is associated with production storage 404 and the replica system 410 is associated with replica storage 412. In this example, the production system 406, which may include the IO source 402, is configured to replicate the data stored on the production storage 404 to the replica storage 412. In one example, the production system 406 may store snapshots and may replicate the snapshots to the replica system 410.

The tree 420 is an example of a Merkle tree and is associated with the production system 406. The tree 420 is representative of the production storage 404. In other words, the production storage 404 may be a block type device and the leaves of the tree 420 correspond to the blocks of the production storage 404. Similarly, the tree 422 is an example of a Merkle tree and corresponds to the replica storage 412, which may also be a block type device. In this example, the production storage 404 and the replica storage 412 are the same in terms of size and structure in one example. Thus, the size and structure of the trees 420 and 422 are also identical.

The 10 source 402 represents a stream of write or modify IOs that flow within the production system. In RP/RP4VMs (Recover Point or Recover Point for Virtual Machines), for example, the IO source 402 may be a splitter. Thus, the IO source 402 may receive a write in the production system. The write may be sent to the production storage 404 and the production system 404. The 10 source 402 and the production system 406 thus process the write and send the write to the replica system 410. As a result, changes in the production site to the production data are replicated to the replica site and stored in the replica data. In some examples, a journal may also be used.

With regard to latency, the asynchronous aspects of the data protection system illustrated in FIG. 4 can prevent latency from being added to the process of updating the trees 420 and 422. More specifically, the data protection system includes the trees 420 and 422. Thus, both the production system 406 and the replica system 410 maintain their own Merkle trees 420 and 422.

If the updates of the IOs in the production Merkle tree is synchronous, the IOs are not acknowledged to the IO source until after processing is finished. As a result, latency is introduced. Further, synchronous updates of the IOs in the replica Merkle tree 422 requires that both the production tree 420 and the replica tree 422 need to be in sync. This increases the latency associated with the network communications and introduces additional latency as the replica tree is updated.

Embodiments of the invention, however, allow for asynchronous updates, and thus avoids these types of latencies. In one example, the production system 406 and the replica system 410 process data independently. The results are coordinated between the production system 406 and the replica system 410.

Asynchronous processing can be achieved by adding or associating a queue to the trees 420 and 422. In this example, the queue 424 is added to or associated with the tree 420 and the queue 426 is added to or associated with the tree 422 at the replica site. Each entry in the queue 424 and the queue 426 includes an IO location and an associated hash (the hash could be computed separately if necessary). The hash is the hash of the corresponding 10 or data block. Thus, the queues 424 and 426 contain pairs of {IO Location, new Hash}. The location is the disk location of the IO or change and corresponds to a leaf node of the tree 420 and 422. The hash is the hash value of the new incoming data or of the new block of data.

In one example, the new hash is something that is already being calculated in many systems regardless of the Merkle tree and so should incur minimal to no additional delay. Large IOs may be broken into appropriate sizes if necessary. Further embodiments of the invention can be applied to devices that are not necessarily block based devices. Embodiments of the invention can process the data in blocks in any event or using another chunk size or other mechanism.

In one example, all IOs in the queue are associated with the same size of data (the hash chucking size may be 4K-8K). Changes coming into the production system and into the replica system are inserted in the respective queues (a very fast operation) and immediately acknowledged back. As a result, the additional latency is close to negligible.

As previously stated, the queue 424 is used, initially, to only update the leaf nodes of the tree 420. Similarly, the queue 426 is initially only used to update the leaf nodes of the tree 422. The nodes affected by the changes in the production site (the nodes updated based on entries in the queues 424 and 426) are inserted into a list such as the list 250 (each tree is associated with its own list). When a snapshot is to be closed, all IOs in the queue up to the snapshot closing point will be used to update the leaves of the trees. Then, the tree will update itself efficiently as described herein. IOs coming in while the tree is updating are queued in the queue and processed after the update for the current SID completes. This allows the trees 420 and 422 to be processed at a snapshot level.

In one example, the root hashes of the trees 420 and 422 are coordinated. By coordinating the root hashes, the synchronization state of the production storage 404 and the replica storage 412 can be determined. Further, errors in the replica storage 412 can be identified and rectified or healed. More specifically, the production system and the replica system are separately and independently associated with their own Merkle trees that are updated asynchronously as previously described. With this system, the trees 420 and 422 update efficiently and with negligible delay. In addition, the trees 420 and 422 are updated in a manner that allows the root hashes at specific time related values (e.g., the SIDs) to reflect the hash of the corresponding volumes for the snapshot. However, because the trees 420 and 422 are updated asynchronously, the values of the root hashes may arrive or be generated at different times.

In one example, each snapshot or each snapshot closing may result in a pair that is sent in a message to a sync engine. The pair or message may include: a root hash and a corresponding SID or other time related value.

Figure 5:
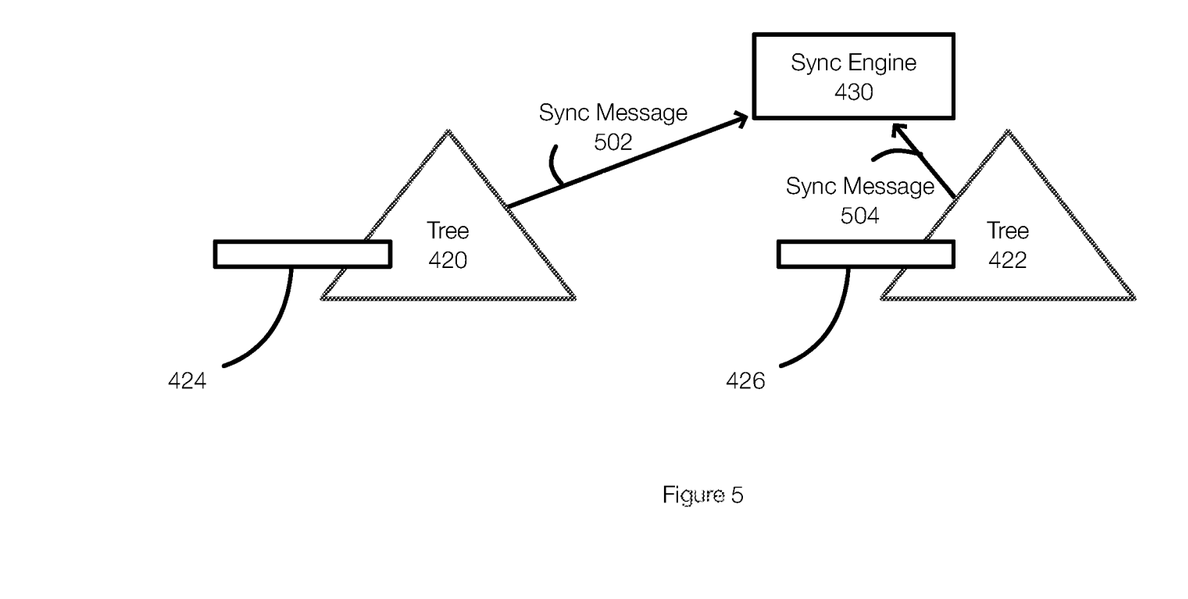
FIG. 5 illustrates an example of a sync engine configured to verify whether production data is synchronized with replica data.

The asynchronous nature of these tree updates can be resolved, as illustrated in FIG. 5, using a sync engine 430. The sync engine 430 may be implemented using various structures including a list, an array, an associative array and a last processed timestamp variable.

In this example, the sync engine 430 is implemented at the replica site or on each replica site if more than one replica site is present. In one example, the production system sends a sync message 502 to the sync engine 430. The replica system also sends a sync message 504 to the sync engine 430. The sync messages 502 and 504 each contain the root hash of the closed snapshot. Thus, regardless of when the sync messages arrive at the sync engine 430, the synchronization of the production data and the replica data is achieved when the root hashes received from the production system and the replica system for a time T or associated with the same SID match.

If the root hashes do not match, the trees 420 and 422 (and the replicated data) can self-heal by starting a synchronization process. More generally, when the root hashes for a given snapshot or time related value do not match, a synchronization process is started. This may include using the trees to identify which blocks need to be synchronized.

In one example, the sync messages 502 and 504 may include a key value pair such as {time-related value, hash}. The last processed timestamp or variable, by way of example, is the time of the last time processed. For example, if the trees were processed for the SID 32 and processing being performed for the SID 33, the last processed variable is 32. The variable may start out with a value of 0 in one example and is incremented as needed or after replication at time T is evaluated.

The following pseudo-code describes this process. This pseudo-code may be called based on the contents of the sync messages 502 and 504. In addition, this process or function may be called once a snapshot is closed.

Operation Test_and_Insert (Newpair):

```
If newpair.timestamp< Last_Processed_Timestamp discard the
    newpair
//already handled more advanced times and can be ignored//
existingpair = get item from list for time newpair.timestamp
If existingpair is null insert newpair to list //not in list so insert it
Else {
    If newpair.hash == existingpair.hash then {
        //production site and replica site are synchronized//
        Last_Processed_Timestamp = existingpair.timestamp
        Remove from list timestamps <= newpair.timestamp
    }
    Else {
        // Hashes do not match - replication is inconsistent//
        Start efficient sync using Merkle trees
    }
}
```

In one example, once a time related value is match, all older time related values can be removed from the sync engine 430 at least because the trees and the corresponding data are synchronized or verified for a more advanced or later time related value. This does not convey that all previous root hashes/timestamps were consistent. Rather, there is no longer a need to test the older root hashes/times for healing purposes at least because the trees and the corresponding data are now synchronized.

FIGS. 4 and 5 thus illustrate a system that performs data protection operations including replication operations using asynchronous augmented Merkle trees at both the production site and the replica site. During operation or during replication, IOs are inserted into the trees and the trees are updated when the snapshot closes. The root hashes are send to a sync engine. When the root hashes match at a given time, the replication is deemed to be synchronized and accurate. If they do not match, the trees are healed and the data is healed by resynchronizing. In one example, the inconsistency can be detected quickly. As a result, the amount of data needed to be transferred can be very small at least because, depending on the rate at which snapshots are taken, the amount of data passing through the system is typically small.

Asynchronous Merkle trees and a sync engine allow IOs flowing through the production system to be decoupled from updating the Merkle trees. Further, latency associated with synchronous updates is removed while still allowing the root hashes to be coordinated using the sync messages and the sync engine, which coordinates the comparison of root hashes at snapshot closing times.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to data protection operations.

Following are some further example embodiments of the invention. These are presented only by way of example and are not intended to limit the scope of the invention in any way.

Embodiment 1. A method for replicating data associated with a production site to a replica site, wherein the production site is associated with a production tree and the replica site is associated with a replica tree, the method comprising updating leaf nodes of the replica tree asynchronously with respect to the production tree.adding references to leaf nodes that have been updated to a list, and after the leaf nodes have been updated, updating other nodes in the replica tree based on the list.

Embodiment 2. The method of embodiment 1, further comprising updating leaf nodes of the production tree asynchronously with respect to the replica tree.

Embodiment 3. The method of embodiment 1 and/or 2, further comprising updating the leaf nodes of the replica tree once for a given set of input/outputs, wherein the input/outputs correspond to a particular time related value.

Embodiment 4. The method of embodiment 1, 2, and/or 3, further comprising queuing input/outputs for the replica tree and queuing the input/outputs for the production tree in a different queue.

Embodiment 5. The method of embodiment 1, 2, 3, 4 and/or 5, further comprising sending a root hash to a sync engine when closing a snapshot by the replica site and sending a root hash to the sync engine when closing the snapshot by the production site.

Embodiment 6. The method of embodiment 1, 2, 3, 4, and/or 5, further comprising comparing the root hash from the production site with the root hash from the replica site for a specific snapshot or for a specific time related value.

Embodiment 7. The method of embodiment 1, 2, 3, 4, 5, and/or 6, further comprising performing a resynchronization when the root hash of the production site does not match the root hash of the replica site.

Embodiment 8. The method of embodiment 1, 2, 3, 4, 5, 6, and/or 7, further comprising, when any of the other nodes are updated, these nodes are updated a single time for a particular snapshot.

Embodiment 9. The method of embodiment 1, 2, 3, 4, 5, 6, 7, and/or 8, further comprising coordinating time differences between a time when the replica tree is updated and a time when the production tree is updated.

Embodiment 10. The method of embodiment 1, 2, 3, 4, 5, 6, 7, 8, and/or 9, further comprising monitoring the production site and splitting IOs.

A non-transitory storage medium having stored therein instructions that are executable by one or more hardware processors to perform the operations or methods of any one or more of embodiments 1 through 10. Systems and devices configured to perform the operations or methods of any one or more of embodiments 1 through 10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for replicating data associated with a production site to a replica site, wherein the production site is associated with a production tree and the replica site is associated with a replica tree, the method comprising:
   updating leaf nodes of the production tree up to a time related value;
   updating leaf nodes of the replica tree up to the time related value;
   adding references to leaf nodes that have been updated in the production tree to a first list;
   adding references to leaf nodes that have been updated in the replica tree to a second list;
   after the leaf nodes of the production tree and the replica tree have been updated, updating other nodes in the production tree and in the replica tree based on the first list and the second list respectively; and
   determining that the replica site is synchronized with the production site at the time related value when a top value of the production tree matches a top value of the replica tree.

2. The method of claim 1, wherein the data being replicated is a snapshot, further comprising updating the other nodes in the replica tree after all data in a snapshot is processed and corresponding leaf nodes in the replica tree have been updated.

3. The method of claim 1, performing a healing operation when the top value of the production tree does not match the top value of the replica tree at a point in time.

4. The method of claim 3, wherein the healing operation includes identifying discrepancies between the production tree and the replica tree.

5. The method of claim 4, synchronizing data based on the discrepancies.

6. The method of claim 5, wherein the discrepancies allow data required to be resynchronized to be identified and transferred without transferring an entire snapshot.

7. The method of claim 1, wherein the production tree and the replica tree are updated asynchronously.

8. The method of claim 7, further comprising synchronizing the production tree and the replica tree based on time related values.

9. The method of claim 1, wherein the top value of the production tree is a root hash and the top value of the replica tree is a root hash, further comprising sending the root hash of the replica tree to a sync engine when closing a snapshot by the replica site and sending the root hash of the production tree to the sync engine when closing the snapshot by the production site.

10. The method of claim 9, further comprising comparing the root hash from the production site with the root hash from the replica site for a specific snapshot or for the time related value.

11. A non-transitory storage medium having stored therein instructions that are executable by one or more hardware processors to perform operations for replicating data of a production site to a replica site, wherein the production site is associated with a production tree and the replica site is associated with a replica tree, the operations comprising:
   updating leaf nodes of the production tree up to a time related value;
   updating leaf nodes of the replica tree up to the time related value;
   adding references to leaf nodes that have been updated in the production tree to a first list;
   adding references to leaf nodes that have been updated in the replica tree to a second list;

after the leaf nodes of the production tree and the replica tree have been updated, updating other nodes in the production tree and in the replica tree based on the first list and the second list respectively; and determining that the replica site is synchronized with the production site at the time related value when a top value of the production tree matches a top value of the replica tree.

12. The non-transitory storage medium of claim 11, wherein the data being replicated is a snapshot, further comprising updating the other nodes in the replica tree after all data in a snapshot is processed and corresponding leaf nodes in the replica tree have been updated.

13. The non-transitory storage medium of claim 11, performing a healing operation when the top value of the production tree does not match the top value of the replica tree at a point in time.

14. The non-transitory storage medium of claim 13, wherein the healing operation includes identifying discrepancies between the production tree and the replica tree.

15. The non-transitory storage medium of claim 14, synchronizing data based on the discrepancies.

16. The non-transitory storage medium of claim 15, wherein the discrepancies allow data required to be resynchronized to be identified and transferred without transferring an entire snapshot.

17. The non-transitory storage medium of claim 11, wherein the production tree and the replica replicate tree are updated asynchronously.

18. The non-transitory storage medium of claim 17, further comprising synchronizing the production tree and the replica tree based on time related values.

19. The non-transitory storage medium of claim 11, wherein the top value of the production tree is a root hash and the top value of the replica tree is a root hash, further comprising sending the root hash of the replica tree to a sync engine when closing a snapshot by the replica site and sending the root hash of the production tree to the sync engine when closing the snapshot by the production site.

20. The non-transitory storage medium of claim 19, further comprising comparing the root hash from the production site with the root hash from the replica site for a specific snapshot or for the time related value.

* * * * *